United States Patent [19]

Hayashi

[11] 4,398,169
[45] Aug. 9, 1983

[54] RESISTANCE THERMOMETER ELEMENT

[76] Inventor: Masaki Hayashi, Ikuta Haimu No. 110, 3207-6 Ikuta, Tama-ku, Kawasaki-shi, Kanagawa-prefecture, Japan

[21] Appl. No.: 217,692

[22] Filed: Dec. 18, 1980

[30] Foreign Application Priority Data

Jun. 23, 1980 [JP] Japan .............................. 55-91007[U]

[51] Int. Cl.³ .............................................. H01C 3/04
[52] U.S. Cl. ..................................... 338/25; 374/165; 374/185
[58] Field of Search ............................... 338/22 R–25, 338/28, 51, 229, 238–242, 243–247; 29/612; 73/362 AR

[56] References Cited

U.S. PATENT DOCUMENTS 3,197,728 7/1965 Wright ............................ 338/243 X
3,286,214 11/1966 Kolb et al. ........................ 338/28 X
4,228,343 10/1980 Kanner et al. ................... 219/505 X

FOREIGN PATENT DOCUMENTS 2614433 10/1976 Fed. Rep. of Germany ...... 219/225
54-12960 1/1979 Japan ................................ 338/22 R Primary Examiner—B. A. Reynolds
Attorney, Agent, or Firm—Robert E. Burns; Emmanuel J. Lobato; Bruce L. Adams

[57] ABSTRACT

A ceramic thermometer resistance element comprises a coil-shaped resistor for measuring temperature inserted in a ceramic tube together with ceramic spherical filler particles of 40 to 150 μm to thereby fix the resistor. The ceramic spherical filler particles are previously calcined at temperatures much higher than the upper limit of the temperature-measuring range of the element. The filler particles exhibit a liquid-like character and, accordingly, can fill up the gaps between the ceramic tube and the coil-shaped resistor and the gaps of the coils thereof, so that the filler particles hold the resistor statically in the ceramic tube.

7 Claims, 5 Drawing Figures

RESISTANCE THERMOMETER ELEMENT

BACKGROUND OF THE INVENTION

1. Field of the Invention

The present invention relates to a sealed type thermometer resistance element which is employed for measuring precision temperature, and more particularly to a thermometer resistance element which comprises a coil-shaped resistor for measuring temperature which is located in a slender ceramic tube together with a filler which consists of finely divided spherical particles and which is adapted to fix the resistor. Furthermore, the present invention relates to a thermometer resistance element assembly which comprises a thermometer resistance element and a heat transmitting member on which the thermometer resistance element can easily be mounted and placed into a protective tube.

2. Brief Description of the Prior Art

It is necessary not only that the thermometer resistance element of this type should, of course, satisfy a variety of electrical efficiencies stipulated in the Regulations in a range for measuring temperature, but also that the thermometer resistance element be as small and as light as possible, and that both physical and mechanical properties, such as temperature-response characteristic, shock-proof, etc. be excellent.

There is known a thermometer resistance element which comprises a coil-shaped resistor, such as a platinum wire, etc., placed in a bore of a ceramic insulating tube, together with fillers.

However, conventional fillers are made of crushed electrofused alumina or quartz glass. An enlarged view of the shape of these fillers shows an amorphous state of crushed fragments having sharp wedge portions, as in cracked rocks. Moreover, the size of each particle is uneven.

It is next to impossible to uniformly fill up with such uneven particles the bore of the insulating tube having a diameter of 0.8 mm in which a resistor having a coil diameter of 0.4 mm is housed, without the help of a special apparatus. In addition to such a difficulty, unevenness in packing density is liable to occur in the longitudinal direction of the bore, and it is substantially impossible to uniformly fill up the inner side of a coil having a small coil diameter.

Further, it is very likely that filler particles do not get between the coils (or turns) of a coil-shaped resistance wire.

Fillers are expected not only to merely affix a coil-shaped resistor into the insulating tube but also to stably hold the resistor without any deviation in the tube bore, and to maintain a linear state of the coil-shaped wire upon its insertion along the tube bore.

Further, fillers should maintain a uniform pitch of the coils and should not cause any electrical short circuit of the coils when expansion and contraction of the coil occur due to temperature change over a wide range.

For these reasons, it is necessary that filler particles fill a tube with a uniform density, including the spaces (about 50 to 80 μm) between the coils.

Accordingly, it is desired that fillers have a fluid-like capability but should not scatter at the time when they are packed in the tube, and also they should be highly and electrically insulative and be in the form of a single solid.

SUMMARY OF THE INVENTION

An object of the present invention is to provide a thermometer resistance element in which fillers can be easily placed with a high degree of a packing density without causing a short circuit to occur.

A further object of the present invention is to provide a thermometer resistance element which can be affixed at a determined position in a protective tube without requiring any fixing agents, such as magnesium oxide or the like, in the case where the thermometer resistance element is mounted to the protective tube.

DETAILED DESCRIPTION OF THE PREFERRED EMBODIMENTS

Figure 1:
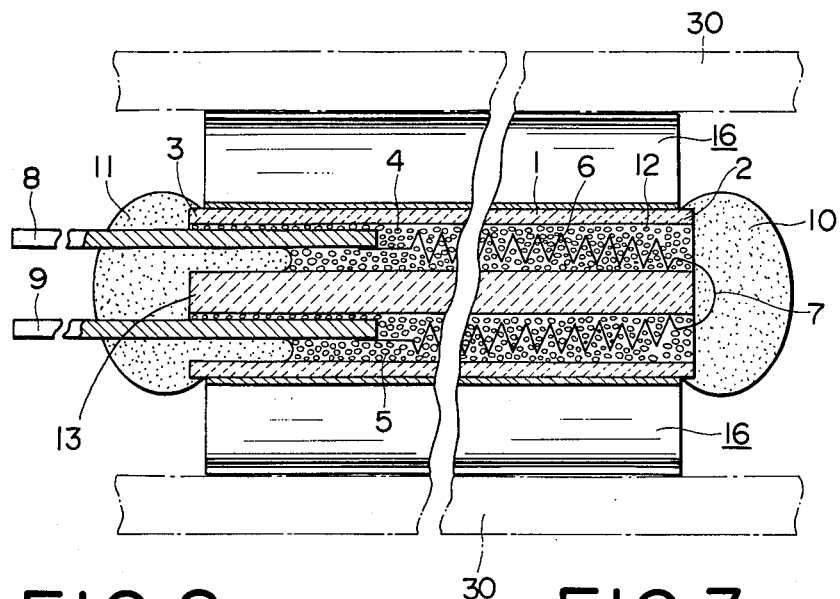
FIG. 1 is an enlarged sectional view of an embodiment of an element according to the present invention.
Figure 2:
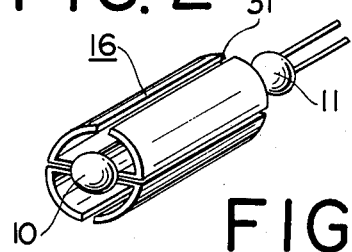
FIG. 2 is a perspective view of an element illustrated in FIG. 1.

The fillers which are employed in the present invention can be prepared as follows.

That is, sludge of highly pure alumina, mullite, etc. is sprayed utilizing a centrifugal force of a high speed rotor and then brought into contact with heated dry air to obtain particles of 30 to 200 μm.

From the particles thus obtained, only particles of 30 to 150 μm are selected and separated. The selected particles are then put in an alumina-made crucible and sintered at temperatures of 1670° to 1710° C.

Thereafter, the sintered fine particles are dispersed by a dry-type or wet-type of ball mill, followed by washing with water and drying. The dried particles are classified and those particles having a size of 30 to 150 μm are used in the present invention. The particles thus obtained have almost a perfect spherical shape when observed under a microscope. The particles do not scatter, as powders do, and have a small friction resistance at the surface of each particle, so that the particles are extremely fluid-like and behave in a container, such as a bag, as if they were liquid. Further, the fine spherical particles have a property in that they stick to each other with a small adhesive force when the particles are heated at 1275°±5° C. for 5 mins.

Preferred embodiments of the thermometer resistance element in accordance with the present invention will be described in more detail with reference to the drawings.

The numeral 1 denotes a commercially available ceramic insulating tube which has ends 2 and 3. A pair of holes (bores) 4 and 5 which are separated from one another by a partition 13 are provided in the tube 1 in the longitudinal direction of the latter. A coil-shaped thermometer resistor 6 placed in the holes 4, 5 is comprised of a winding platinum wire having a diameter of 30 μm, the coil diameter being 0.4 to 0.45 mm.

To the ends of the resistor 6 are previously welded lead wires 8 and 9. The resistor 6 can be inserted in the holes 4 and 5 by inserting the lead wires 8 and 9 from one end of the ceramic insulating tube 1 so that the intermediate portion 7 of the coil-shaped resistor 6 comes out from the end of the tube 1. Then, a sealing agent, such as a glaze or the like, is coated on the end 3 of the tube 1 at the lead wire side, thereby to fix each of the lead wires and at the same time an expanded dome-shaped portion 11 is formed having a spherical diameter larger than the diameter of the ceramic insulating tube 1. The linear shape intermediate portion 7 of the resistor 6 is then tensed.

When the filler 12 consisting of finely divided particles is supplied in the holes 4 and 5 while keeping the tensile force applied to the intermediate portion 7 and while the tube is being slightly vibrated, the filler is sucked down and dropped into the holes as if the filler were a liquid. Thus, the filler fills up the tube 1 and at the same time fills spaces between the coils which have been extended under the tensile force mentioned above.

When the tensile force applied to the resistor is released after the filler has been fully packed, the particles present between the coils are compacted and held by the compressive force of the coils.

In this compact state, the linear portion 7 of the resistor 6 is slightly protruded from the end 2 of the tube 1. This protrusion can be adapted to adjust the resistance of the resistor, which will be later explained. A sealing agent 10 is partially coated on the intermediate portion 7 so as to cover only a part of the intermediate portion 7. Thereafter, the assembly thus obtained is calcined at a temperature of 1270° C., for five minutes in order to stabilize the resistance of the resistor.

The coil resistance can be adjusted by decreasing the length of the intermediate portion 7. For the purpose, the uncoated portion, i.e., the exposed portion of the intermediate portion 7 can be melted by a burner to decrease the length of the intermediate portion, so that the resistance of the resistor 6 is a desired value. The measurement of the desired value can be effected while comparing with a standard resistance with the help of a known comparator. After the resistance adjustment is completed, the sealing agent 10 is coated so as to completely cover the intermediate portion 7 so that the enlarged seal portion is formed. Finally, the entirety is again heated at 1270° C. for 5 minutes or more.

In the present invention, the seal portions formed on the both ends of the ceramic tube is in the form of semi-spherical mass having a diameter larger than a diameter of the ceramic tube 1. It should be noted that the seal portions 10 and 11 can be formed not only in a single coating process but also in several coating processes.

The thermometer resistance element thus prepared exhibits excellent vibration-proof and shock-proof qualities, since the coil-shaped resistor is embedded in and fully covered with the filler particles, and since the spherical particles of the packed filler are in contact with not only the adjacent particles but also the inner surfaces of the holes 4 and 5, and the coils. In addition, thermometric response is also good due to a high degree of packing density.

Further, the thermometer resistance element of the present invention also possesses an advantage of good stability to heat, since both the resistance element and the spherical filler particles are sintered at a temperature much higher than the outside limits of the temperature-measuring range ($-200°$ to $+630°$ C.).

The numeral 16 denotes an elastic heat transmitting member which is mounted so as to surround the peripheral surface of the ceramic tube 1. The heat transmitting member is comprised of two sector halves 18 which are interconnected by spot-welding the flat portions 20 (FIG. 3) thereof, when the flat portions 20 face each other, as shown in FIG. 4. Each sector half of the heat transmitting member is made of a single metal plate consisting of an inner circular arc portion 19 which comes in close contact with the outer surface of the ceramic tube 1, flat portions 20 extending outwardly from the portion 19 and outer circular arcs 21 and 22.

According to the present invention, the inner circular arc portions 19 of the heat transmitting member are not required to be secured to the outer surface of the ceramic tube 1, since the end faces of the heat transmitting member rest on the semispherical masses 10, 11 formed at the ends of the ceramic tube so that the heat transmitting member cannot come out from the tube 1. Accordingly, no operation for securing the heat transmitting member to the tube 1 is necessary. In addition, no fixing agent is also necessary between the heat transmitting member and the ceramic tube, which results in the improvement of heat conductivity. Each sector half 18 has a slit 31 so that the sector half can be elastically deformed.

Figure 3:
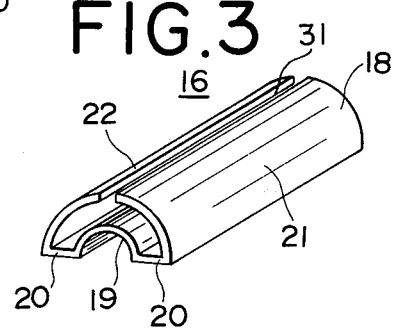
FIG. 3 is a perspective view of a sector half of a heat transmitting member.
Figure 4:
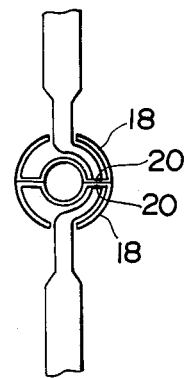
FIG. 4 is an end view of two sector halves interconnected by welding.
Figure 5:
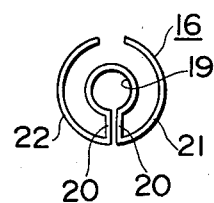
FIG. 5 is an end view of another embodiment of a heat transmitting member.

In the present invention, the shape of the heat transmitting member is not limited to that shown in FIG. 3 but the cross sectional shape as shown in FIG. 5 can also be employed. In FIG. 5, the heat transmitting member is composed of a single plate. Further, in order to make spot-welding of the opposing flat portions 20 simpler, small holes (not shown) through which electrodes (not shown) for the spot-welding are inserted can be provided in the outer circular arc portions 21, 22.

The resistance element assembly of the present invention can easily be inserted into or drawn from a protective tube 30.

When the assembly including the resistance element and the heat transmitting member is inserted into the protective tube 30, the heat transmitting member 16 is elastically deformed so that the diameter of the heat transmitting member is slightly decreased. Therefore, the assembly can be immovably held in the protective tube 30 due to the expansive force of the heat transmitting member 16 which has been elastically deformed, although the slight relative movement would occur between the heat transmitting member and the tube 1. Since no intermediate member is provided between the protective tube 30 and the heat transmitting member 16, according to the present invention, a good thermal response quality can be provided, which ensures a quick temperature measurement by the thermometer resistance element of the present invention.

What is claimed is:

1. A ceramic thermometer resistance element comprising a coil-shaped resistor for measuring temperature inserted in a ceramic tube together with filler particles to thereby fix the resistor, characterized in that the filler particles are composed of ceramic spherical particles having a diameter of 40 to 150 mm which are calcined after insertion in said tube at temperatures much higher than the upper limit of the temperature-measuring range of the element, the ceramic spherical particles filling up the gaps between the ceramic tube and the resistor and the gaps of the coils of the resistor, and adhering to each other by said calcining to hold the resistor statically in the ceramic tube.

2. A ceramic thermometer resistance element according to claim 1, wherein it comprises expanded dome-shaped electrical insulating portions which are provided on the ends of the tube and which are formed by a sealing agent, having a spherical diameter larger than the diameter of the ceramic tube.

3. A ceramic thermometer resistance element according to claim 1 or 2, further comprising a heat transmitting member which is inserted between said ceramic tube and a protective tube in which the ceramic tube is inserted, the heat transmitting member including an inner circular arc portion in close contact with the outer surface of the ceramic tube and outer circular arc portion in close contact with the inner surface of the protective tube.

4. A ceramic thermometer resistance element according to claim 3, wherein the heat transmitting member is composed of a pair of sector halves welded each other.

5. A thermometer resistance assembly comprising a ceramic thermometer resistance element which comprises a coil-shaped resistor, a ceramic tube in which said resistor is inserted, and filler particles which are located in the ceramic tube to immovably hold the resistor in the tube, an elastically deformable heat transmitting member having inner circular arc portions in which said tube is fitted, and a protective outer tube in which said heat transmitting member is located so as to elastically bear against the inner periphery of the protective outer tube, said filler particles being composed of ceramic spherical particles having a diameter of 40 to 150 mm which are calcined in said ceramic tube at temperatures much higher than the upper limit of the temperature-measuring range of the element, the ceramic spherical particles filling up the gaps between the ceramic tube and the resistor and the gaps of the coils of the resistor, and adhering to each other by said calcining to hold the resistor statically in the ceramic tube.

6. A ceramic thermometer resistance element according to claim 1, wherein said ceramic tube has a diameter of the order of 0.8 mm and said coil is wound of wire having a diameter of the order of 30 mm and has a diameter of about 0.4 to 0.45 mm.

7. A ceramic thermometer resistance element according to claim 6, wherein the spaces between turns of said coil are about 50 to 60 mm.

* * * * *